United States Patent [19]

Naito

[11] Patent Number: 5,187,421

[45] Date of Patent: Feb. 16, 1993

[54] ELECTROSTATIC TRANSFORMER

[75] Inventor: Michiko Naito, Tokorozawa, Japan

[73] Assignee: Kabushiki Kaisha ENU-ESU, Tokyo, Japan

[21] Appl. No.: 460,332

[22] PCT Filed: Aug. 29, 1989

[86] PCT No.: PCT/JP89/00875

§ 371 Date: Apr. 23, 1990

§ 102(e) Date: Apr. 23, 1990

[87] PCT Pub. No.: WO90/02439

PCT Pub. Date: Mar. 8, 1990

[30] Foreign Application Priority Data

Aug. 30, 1988 [JP] Japan ............... 63-213690
Sep. 14, 1988 [JP] Japan ............... 63-228381

[51] Int. Cl.$^5$ ............................................. H02M 3/07
[52] U.S. Cl. ........................................ 320/1; 363/59; 307/108; 307/109; 307/110
[58] Field of Search ..................... 320/1; 363/59; 307/108-110

[56] References Cited

U.S. PATENT DOCUMENTS

| 3,091,479 | 6/1962 | Sikorra ............... 320/1 |
| 3,596,369 | 8/1971 | Dickerson ............ 320/43 |
| 3,868,560 | 2/1975 | Hoffman ............... 320/1 |
| 4,616,303 | 10/1986 | Mauthe ............... 363/60 |
| 4,689,734 | 8/1987 | Lang ................. 320/1 |
| 4,807,104 | 2/1989 | Floyd et al. ......... 307/110 |
| 4,965,711 | 10/1990 | Kamp et al. .......... 363/60 |
| 5,051,881 | 9/1991 | Herald ............... 363/60 |

FOREIGN PATENT DOCUMENTS

| 2052382 | 4/1972 | Fed. Rep. of Germany ...... 307/110 |
| 0063931 | 4/1982 | Japan ................ 320/1 |
| 0433605 | 6/1971 | U.S.S.R. ............. 320/1 |
| 0466593 | 6/1975 | U.S.S.R. ............. 363/59 |
| 0955428 | 8/1982 | U.S.S.R. ............. 363/59 |
| 0854591 | 11/1960 | United Kingdom ...... 307/109 |
| 0953522 | 3/1964 | United Kingdom ...... 320/1 |

Primary Examiner—Steven L. Stephan
Assistant Examiner—Thomas M. Dougherty
Attorney, Agent, or Firm—Lowe, Price, LeBlanc & Becker

[57] ABSTRACT

The present invention is an electrostatic transformer, and more particularly an electrostatic transformer capable of electrically insulating the input and output sides thereof without using any transformer. One A of input terminals A and B is connected to one end of a first capacitor $C_1$ via a first switch $S_1$ while the other B of the input terminals A and B is connected to the other end of the first capacitor $C_1$ via a switch $S_4'$ opened and closed simultaneously with the opening and closing operations of the first switch $S_1$ in interlock with same. The one and other terminals of the first capacitor $C_1$ are connected to output terminals a and b, respectively, via a second switch $S_2$ and a switch $S_2'$ closed and opened conversely to the opening and closing operations of the first switch $S_1$ in interlock with same. The inventive electrostatic transformer has the above structure, so that if the first switches $S_1$ and $S_1'$ are opened and closed when a voltage is applied across the input terminals A and B, a voltage similar to the former voltage is applied intermittently across the first capacitor $C_1$ while the switches $S_1$ and $S_1'$ are closed to thereby charge the first capacitor $C_1$. A voltage due to the electric charges stored in the first capacitor $C_1$ will appear across the output terminals a and b via the second switches $S_2$ and $S_2'$ closed while the first switches $S_1$ and $S_1'$ are open.

2 Claims, 4 Drawing Sheets

F I G. 1
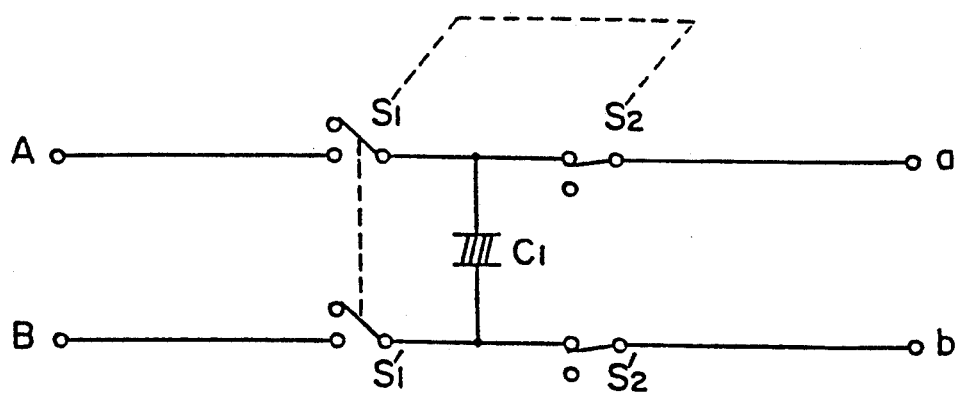
F I G. 2
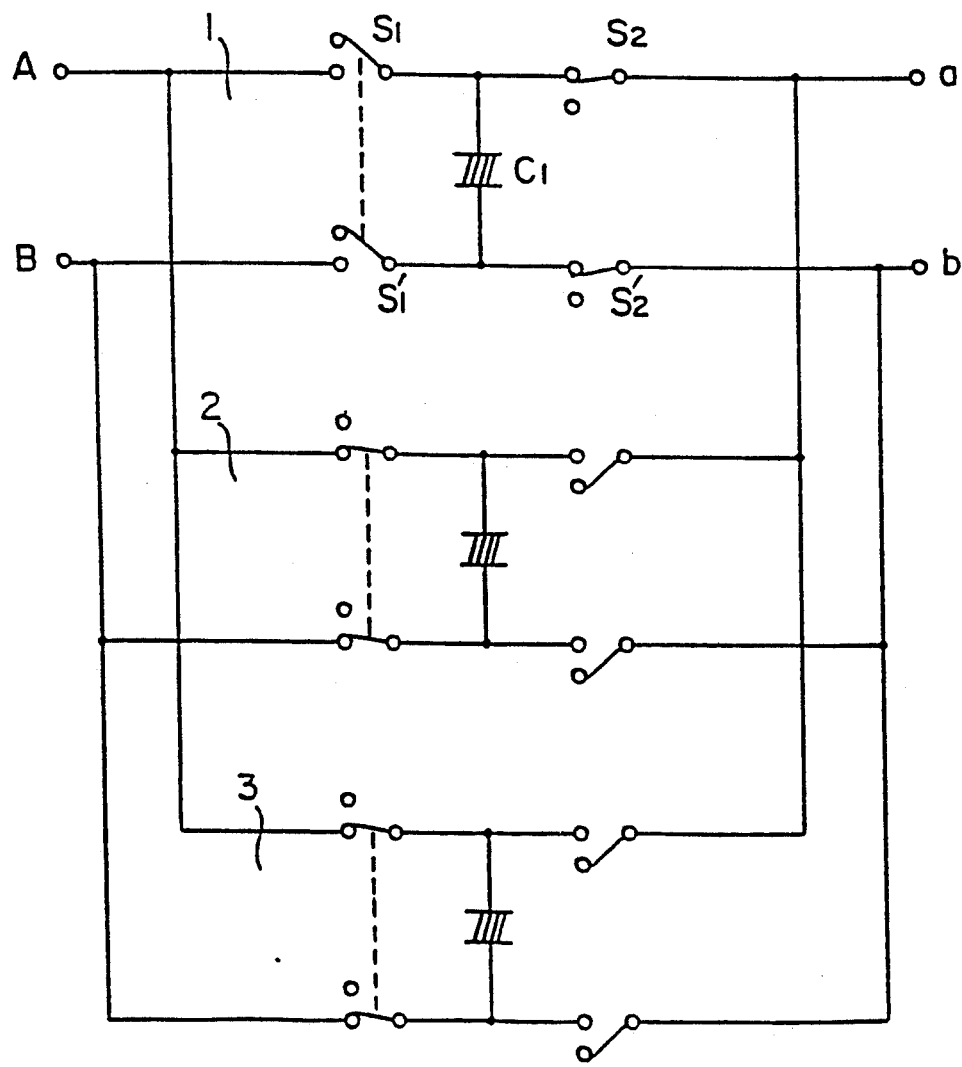

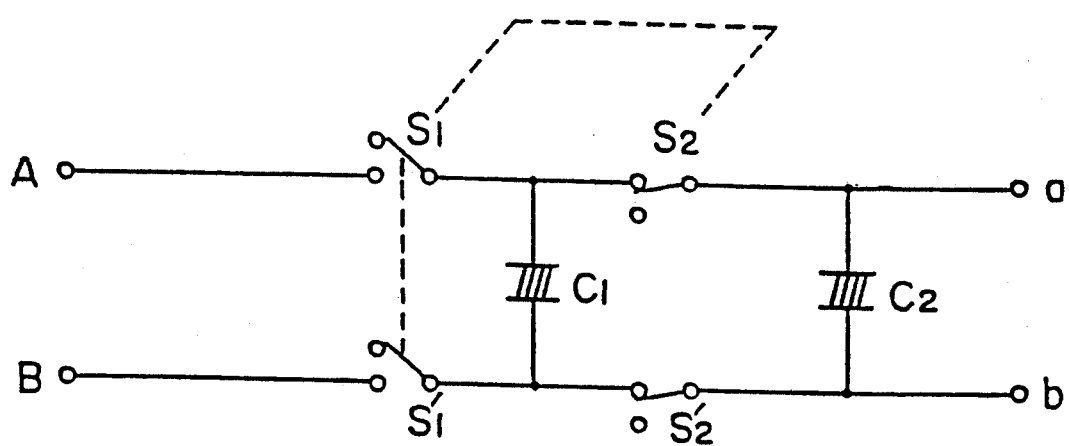
F I G. 3

ELECTROSTATIC TRANSFORMER

TECHNICAL FIELD

The present invention relates to electrostatic transformers and more particularly to an electrostatic transformer capable of electrically insulating the input and output sides thereof from each other without using any transformer.

BACKGROUND ART

Generally, an conventional electrical machine or apparatus uses a transformer the primary and secondary sides of which are electrically insulated from each other.

In a electrical machine or apparatus using such a transformer, the input and output sides of the transformer is electrically insulated, so that if, for example, a commercial power source having one end grounded is connected to the primary side of the transformer, there are no danger of a short circuit and electrical shocks even if any of the secondary side terminals is grounded. Therefore, such power source is usable as one of various power sources, but it includes the transformer, so that the machine or apparatus is weighty and expensive, induced noise would occur, etc., disadvantageously.

The present invention has been made in order to solve such subject of the prior art. It is an object of the present invention to provide an inexpensive electrostatic transformer which is capable of reducing the weight of a device such as an electrical machine or apparatus without using any transformer and which produces no induction noise.

DISCLOSURE OF THE INVENTION

An electrostatic transformer according to the present invention is characterized in that one of input terminals is connected to one terminal of a first capacitor directly or via a diode and a first switch while the other of the input terminals is connected to the other terminal of the first capacitor via a switch opened and closed simultaneously with the opening and closing operations of the first switch in interlock with same, and both the terminals of the first capacitor are connected to corresponding output terminals directly or to corresponding terminals of a second capacitor via a second switch closed and opened simultaneously with the opening and closing operations, respectively, of the first switch in interlock with same and via a switch closed and opened simultaneously with the closing and opening operations, respectively, of the second switch in interlock with same.

The electrostatic transformer according to the present invention is characterized in that one of input terminals is connected to one terminal of a first capacitor directly or via a diode and a first switch while the other of the input terminals is connected to the other terminal of the first capacitor via a switch opened and closed simultaneously with the opening and closing operations of the first switch in interlock with same, and both the terminals of the first capacitor are connected to corresponding terminals of a second capacitor via a second switch closed and opened simultaneously with the opening and closing operations, respectively, of the first switch in interlock with same and via a switch closed and opened simultaneously with the closing and opening operations, respectively, of the second switch in interlock with same, and both the terminals of the second capacitor are connected to the corresponding output terminals.

As described above, in the inventive electrostatic transformer, the output terminals a and b are respectively connected to the input terminals A and B via the first and second switches $S_1$ and $S_2$ and switches $S_1'$ and $S_2'$. When one of these switches is closed, the other is opened, so that the input terminals A and B are completely isolated at all times from the output terminals A and B. Therefore, if, for example, a commercial power source having one end being grounded is connected across the input terminals A and B, there occurs no short circuit even if any one of the output terminals a and b is grounded to thereby achieve the intended object.

As just described above, according to the present invention, an inexpensive electrostatic transformer is obtained which electrically insulates the input and output sides thereof from each other without using any transformer to thereby reduce the weight of a device such as an electrical machine or apparatus and which produces no induction noise.

BRIEF DESCRIPTION OF THE DRAWINGS

FIG. 1 is a circuit diagram of an electrostatic transformer according to the present invention, and FIGS. 2-7 each are a circuit diagram indicative of another embodiment of the present invention.

BEST MODE FOR CARRYING OUT THE INVENTION

Figure 4:
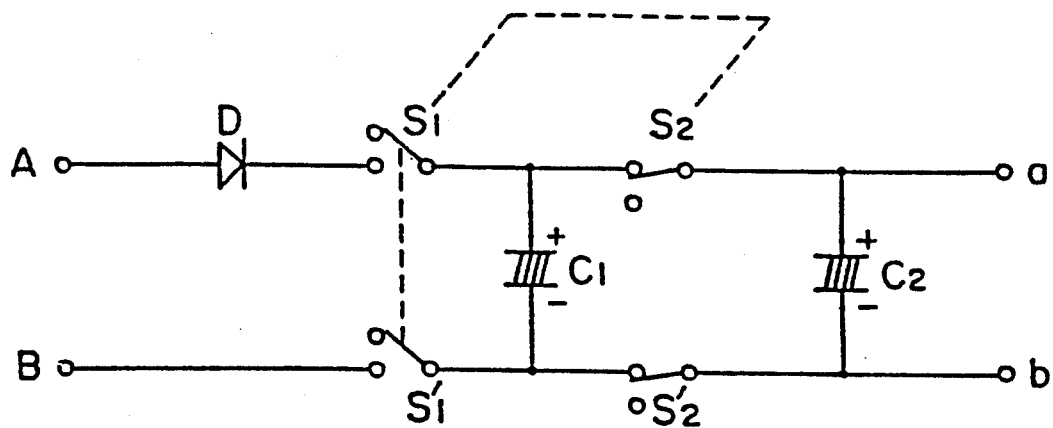

In the present invention, as shown in FIG. 1, one terminal A of input terminals A and B is connected to one end of a first capacitor $C_1$ via a first switch $S_1$ such as a photocoupler and the other terminal B of the input terminals A and B is connected to the other end of the first capacitor $C_1$ via a switch $S_1'$ which is opened and closed simultaneously with the opening and closing operations, respectively, of the first switch $S_1$ in interlock with same.

The one and other terminals of the first capacitor $C_1$ are connected to the output terminals a and b, via a second switch $S_2$ and a switch $S_2'$ which are closed and opened conversely to the opening and closing operations, respectively, of the first switch $S_1$ in interlock with same.

The inventive electrostatic transformer has the above structure. Therefore, if a voltage is applied across the input terminals A and B, and the first switches $S_1$ and $S_1'$ are opened and closed, a voltage similar to the former voltage is applied intermittently across the first capacitor $C_1$ while the switches $S_1$ and $S_1'$ are being closed to thereby charge the first capacitor $C_1$.

Due to the electric charges stored in the first capacitor $C_1$, a voltage appears across the output terminals a and b via the second switches $S_2$ and $S_2'$ which are closed when the first switches $S_1$ and $S_1'$ are open.

In another embodiment of the present invention, as shown in FIG. 2, a plurality of, for example three, circuits each including the first and second switches and the capacitor are connected in parallel such that when a set of switches are opened and closed, the remaining sets of switches are closed and opened conversely.

In the particular embodiment, if the respective sets of switches are operated at sequentially different orders of timing, a time lag involving the charging of the capacitor is compensated for to thereby obtain a waveform output, more similar to the input waveform, from the output terminals in electrical insulated relationship to the input side.

In a further embodiment of the present invention, as shown in FIG. 3, one A of the input terminals A and B is connected to one end of a first capacitor $C_1$ via a first switch $S_1$ such as a photocoupler while the other B of the input terminals A and B is connected to the other end of the first capacitor $C_1$ via a switch $S_1'$ which is opened and closed in interlock with the first switch $S_1'$.

The one and other terminals of the first capacitor $C_1$ are connected to the corresponding terminals of a second capacitor $C_2$ via a second switch $S_2$ and a witch $S_2'$ which are closed and opened conversely to the opening and closing operations of the first switch $S_1$ in interlock with same. Both the terminals of the second capacitors $C_2$ are connected to the corresponding output terminals a and b.

If, for example, an AC voltage of 50 Hz is applied across the input terminals A and B and the first switches $S_1$ and $S_1'$ are opened and closed at a frequency of several times that of the AC voltage in the electrostatic transformer of the particular embodiment, an AC voltage similar to the former AC voltage is applied intermittently across the first capacitor $C_1$ during the time when the switches $S_1$ and $S_1'$ are closed to thereby charge the first capacitor $C_1$.

The second capacitor $C_2$ is charged with electric charges, stored in the first capacitor $C_1$, via the second switches $S_2$ and $S_2'$ closed while the first switches $S_1$ and $S_1'$ are open, so that an AC voltage appears across the output terminals a and b connected to the corresponding terminals of the second capacitor $C_2$.

In a further embodiment of the present invention, as shown in FIG. 4, one terminal A of input terminals A and B is connected to one end of a first capacitor $C_1$ via a diode D and a first switch $S_1$ such as a photocoupler while the other terminal B of the in the terminals A and B is connected to the other end of the first capacitor $C_1$ via a switch $S_1'$ opened and closed simultaneously with the opening and closing operations, respectively, of the first switch $S_1$ in interlock with same.

The one and other terminals of the first capacitor $C_1$ are connected to the corresponding terminals of a second capacitor $C_2$ via a second switch $S_2$ and a switch $S_2'$ closed and opened conversely to the opening and closing operations, respectively, of the first switch $S_1$ in interlock with same to thereby connect both the terminals of the second capacitor $C_2$ to the corresponding output terminals a and b of the second capacitor $C_2$.

In the particular embodiment, if an AC voltage, for example of 50 Hz, is applied across the input terminals A and B and if the first switches $S_1$ and $S_1'$ are opened and closed at a frequency several times that of the AC voltage, an AC voltage similar to the former AC voltage is applied intermittently across the first capacitor $C_1$ while the switches $S_1$ and $S_1'$ are being closed to thereby charge the first capacitor $C_1$.

The second capacitor $C_2$ is charged with the electric charges stored in the first capacitor $C_1$ via the second switches $S_2$ and $S_2'$ closed while the first switches $S_1$ and $S_1'$ are open and a DC voltage appears across the output terminals a and b connected to the corresponding terminals of the second capacitor $C_2$.

Figure 5:
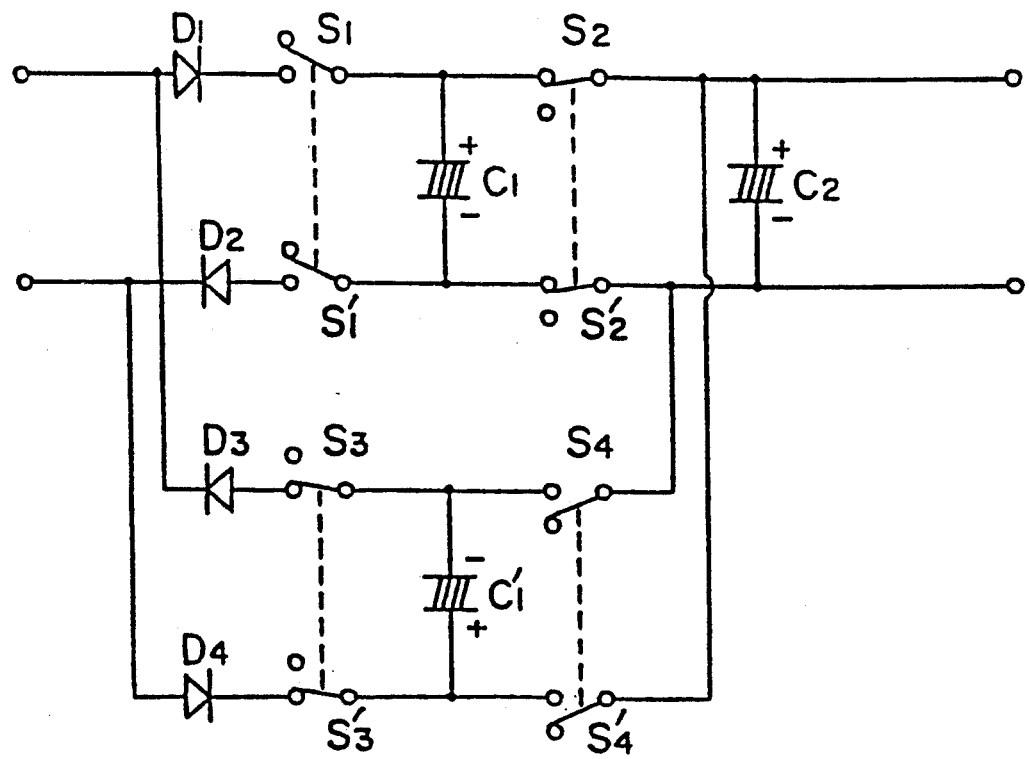

FIG. 5 shows still another embodiment of the present invention consisting a conventional full-wave rectifier which uses four diodes $D_1$-$D_4$ as the diode D; the first and second switches $S_1$, $S_2$ and switches $S_1'$, $S_2'$; the corresponding similar switches $S_3$, $S_4$ and $S_3'$, $S_4'$; and a capacitor $C_1'$ corresponding and similar to the first capacitor $C_1$. According to the particular embodiment, an increased output voltage is obtained.

Figure 6:
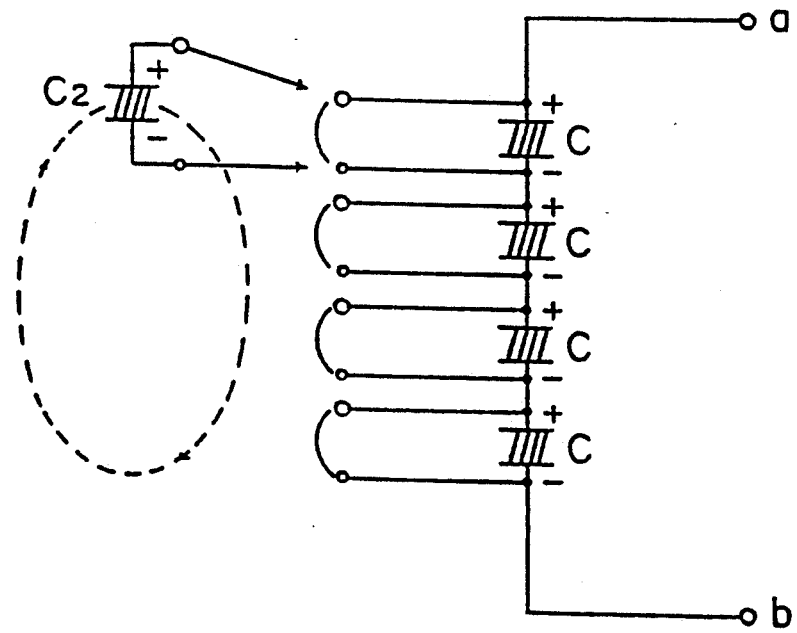

FIG. 6 illustrates a still further embodiment in which a plurality of, for example four, capacitors C connected in series across the output terminals a and b and are impressed sequentially and cyclically with the electric charges stored in the second capacitor $C_2$ to thereby amplify the output voltage to a value which is several times as large as it used to be.

Instead of being opened and closed at half cycle intervals of AC voltage, the switches may be opened and closed at intervals shorter than the half cycle period of the AC voltage. In this case, an AC is obtained as the output.

Figure 7:
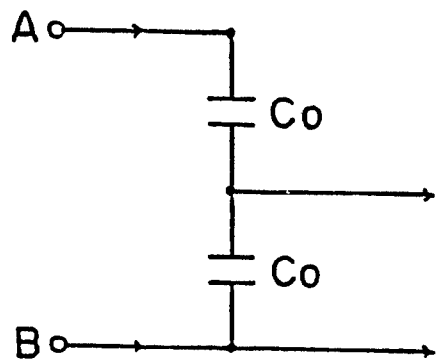

In order to reduce the output terminal voltage, for example, two capacitors $C_o$ may be connected in series across the input terminals A and B and the voltage across one capacitor $C_o$ may be used as an input voltage, as shown in FIG. 7.

INDUSTRIAL APPLICABILITY

As described above, according to the electrostatic transformer of the present invention, the input and output sides of the transformer can be insulated electrically without using any transformer in the conventional manner. If the inventive transformer is used in various electrical machines and apparatus, the weight of these machines and apparatus is reduced, and no induction noise is produced. They are inexpensive and have no danger of a short circuit and electrical shocks. Thus, the inventive transformer is usable in a wide range of applications.

I claim:

1. An electrostatic transformer circuit for isolating an alternating current source from an output comprising:
   first and second input terminals for connecting to said alternating current source;
   first and second output terminals;
   a capacitor having first and second capacitor terminals;
   first switch means for simultaneously connecting said first and second capacitor terminals to said first and second input terminals, respectively;
   second switch means for simultaneously connecting said first and second capacitor terminals to said first and second output terminals, respectively;
   wherein said second switch means are interlocked with said first switch means for successively connecting said capacitor alternately only to each of said input terminals and said output terminals for supplying an alternating current output voltage corresponding to said alternating current source, whereby said output is isolated from said alternating current source;
   a second capacitor;
   third switch means for simultaneously connecting said second capacitor to said first and second input terminals;
   fourth switch means for simultaneously connecting said second capacitor to said first and second output terminals;
   wherein said fourth switch means are interlocked with said third switch means for successively connecting said second capacitor alternately only to each of said input terminals and said output terminals, for successively connecting said input terminals alternately to said first and second capacitors, and for successively connecting said output terminals alternately to said first and second capacitors; and first half wave rectification means connected between first switch means and said input terminals and second half wave rectification means connected between said third switch means and said input terminals; and wherein said first and second half wave rectification means conduct current during opposite polarity cycles of the alternating current source.

2. An electrostatic transformer circuit for isolating an alternating current source from an output comprising:

first and second input terminals for connecting to said alternating current source;

first and second output terminals;

a first capacitor having first and second capacitor terminals;

first switch means for simultaneously connecting said first and second capacitor terminals to said first and second input terminals, respectively;

a second capacitor directly connected to said first and second output terminals; and second switch means for simultaneously connecting said first and second capacitor terminals to said first and second output terminals, respectively;

wherein said second switch means are interlocked with said first switch means for successively connecting said capacitor alternately only to each of said input terminals and said output terminals for supplying an alternating current output voltage corresponding to said alternating current source, whereby said output is isolated from said alternating current source; and further comprising a plurality of additional capacitors connected in series between third and fourth output terminals, wherein said first and second output terminals are sequentially connected in parallel with each of the plurality of additional capacitors to amplify the voltage at the first and second output terminals.

* * * * *